United States Patent [19]

Hann et al.

[11] Patent Number: 5,755,972
[45] Date of Patent: May 26, 1998

[54] METHOD FOR METAL SULFATE SCALE CONTROL IN HARSH OILFIELD CONDITIONS

[75] Inventors: William Mathis Hann, Gwynedd; Susan Tabb Robertson, Ambler; Barry Weinstein, Dresher, all of Pa.

[73] Assignee: Rohm and Haas Company, Philadelphia, Pa.

[21] Appl. No.: 790,868

[22] Filed: Feb. 3, 1997

Related U.S. Application Data

[60] Provisional application No. 60/012,656 Mar. 1, 1996.

[51] Int. Cl.$^6$ .................................................. C02F 5/12
[52] U.S. Cl. .................. 210/701; 166/279; 166/310; 210/698; 252/180; 507/121
[58] Field of Search .......................... 166/244.1, 279, 166/310; 210/701, 698; 252/180; 507/119–121

[56] References Cited

U.S. PATENT DOCUMENTS

| 3,928,196 | 12/1975 | Persinski et al. | 210/58 |
|---|---|---|---|
| 4,710,303 | 12/1987 | Emmons et al. | 210/698 |
| 4,784,774 | 11/1988 | Amjad et al. | 210/699 |
| 4,898,677 | 2/1990 | Brase | 210/701 |
| 4,937,002 | 6/1990 | Bainbridge et al. | 210/701 |
| 4,947,934 | 8/1990 | Hen | 166/279 |
| 5,092,404 | 3/1992 | Falk et al. | 166/244 |
| 5,263,541 | 11/1993 | Barthorpe et al. | 166/279 |
| 5,360,065 | 11/1994 | Falk | 210/701 |

FOREIGN PATENT DOCUMENTS

| 0 184 894 A1 | 6/1986 | European Pat. Off. . |
|---|---|---|
| 0 297 049 A1 | 12/1988 | European Pat. Off. . |
| 0 478 018 A1 | 4/1992 | European Pat. Off. . |

OTHER PUBLICATIONS

Special Publication: Royal Society of Chemistry; Third Intern. Symposium on Chemicals in the Oil Industry; No. 67, 1988 Delft, pp. 65–86, M.C. Van Der Leeden: *Development of Inhibitors for Barium Sulphate Deposition*.

*Primary Examiner*—Peter A. Hruskoci
*Attorney, Agent, or Firm*—Thomas J. Howell

[57] ABSTRACT

A method for inhibiting barium sulfate precipitation in low pH aqueous fluids of underground petroleum-bearing formations by adding to such systems an effective amount of low molecular weight water-soluble polymer containing 5–35 weight percent sulfonic acid monomer units and 65–95 weight percent carboxylic acid monomer units, is provided. Polymer compositions based on 10–15 weight percent 2-acrylamido-2-methyl-1-propanesulfonic acid, 15–65 weight percent acrylic acid and 25–70 weight percent maleic acid are particularly preferred for use at very low pH conditions, e.g., 5.5 or less in the presence of high sulfate ion and barium ion concentrations.

11 Claims, No Drawings

METHOD FOR METAL SULFATE SCALE CONTROL IN HARSH OILFIELD CONDITIONS

This application claims priority to Provisional Application No. 60/012,656 filed Mar. 1, 1996.

BACKGROUND

This invention relates to an improved process for preventing scale formation in aqueous systems found in underground petroleum-bearing formations having low pH and high salt content by the addition of certain low molecular weight, water-soluble polymers. More particularly the invention relates to the selection of certain polymer compositions that exhibit unexpectedly improved precipitation inhibition, especially for inhibiting the precipitation of barium sulfate under conditions where conventional scale-inhibiting polymers are ineffective.

Precipitation of inorganic salts, such as calcium carbonate and calcium, barium and strontium sulfate, as scale deposits is a common problem in oil field operations for the recovery of petroleum products from underground petroleum-bearing formations. The mixing of incompatible aqueous fluids during field operations, especially enhanced oil recovery activities involving a waterflood or water drive, encourages inorganic salt scale formation and deposition in the formation as well as in appurtenant production equipment and transfer lines. Incompatibility occurs when two or more aqueous fluids are mixed and each contains distinct ions that are capable of combining to form precipitates that deposit as scale. Typically the formation water or brine present in a reservoir will contain barium, calcium and possibly strontium ions and the injection water used during enhanced oil recovery operations will contain sulfate ions. An example is illustrated by offshore oilfield procedures where large volumes of sea water containing high concentrations of sulfate ion are used as injection water for underground petroleum-bearing formations containing brine with high concentrations of calcium, barium and strontium. Upon mixing of the injection and formation fluids, precipitation of barium, calcium or strontium sulfate will occur within the formation itself and in surface production equipment and transfer lines; a typical mixing point for the two fluids is in the near production well bore area of the underground petroleum-bearing formations.

Cleaning and removal of scale deposits within underground petroleum-bearing formations and from the associated surface production equipment and transfer lines is expensive, time-consuming and relatively ineffective and conventionally involves the use of mechanical methods, such as impact or cavitation jets. A method that is more preferable to the frequent physical cleaning of scale deposits is the use of scale inhibitors to minimize the formation of scale deposits and thus reduce the frequency of physical cleaning. Conventional scale inhibitors, primarily polyelectrolytes such as phosphonates and low molecular weight carboxylate polymers, while generally satisfactory for inhibiting scale formation over a range of oilfield conditions, have been ineffective at the low pH conditions, i.e., less than about 6, encountered in certain underground petroleum-bearing formations. The lack of scale-inhibiting effectiveness of conventional scale inhibitors increases as the pH of the formation water decreases.

An approach to solving the scale formation problem at low pH conditions involves the use of polyvinyl sulfonate polymers as scale inhibitors. For example, U.S. Pat. No. 4,710,303 and U.S. Pat. No. 5,092,404 disclose the use of low and high molecular weight polyvinyl sulfonate polymers, respectively, for the inhibition of barium sulfate precipitation in low pH waters found in underground petroleum-bearing formations. While somewhat effective as scale inhibitors, the use of polyvinyl sulfonate polymers does not address additional requirements of effective scale inhibitors used in these applications. For example, adsorption characteristics of the scale inhibitor on the subterranean formation surfaces is an important feature that allows extended time periods before additional treatments of scale inhibitor are required. The use of polyvinyl sulfonate polymers in oilfield applications does not satisfy this requirement.

The process of the present invention overcomes the deficiencies of prior methods used to inhibit scale formation at low pH conditions in underground petroleum-bearing formations and provides a process that inhibits scale formation, especially barium sulfate, for extended periods of time and allows for low use levels of the scale inhibitors.

STATEMENT OF INVENTION

The present invention provides a method for inhibiting metal sulfate salt scale formation in an aqueous fluid being present in or produced from an underground petroleum-bearing formation, comprising contacting the aqueous fluid with an effective amount of a water-soluble polymer comprising monomer units of (a) from 5 to 35 percent by weight of unsaturated sulfonic acid monomer selected from one or more of 2-acrylamido-2-methyl-1-propanesulfonic acid, 2-methacrylamido-2-methyl-1-propanesulfonic acid, 3-methacrylamido-2-hydroxy-1-propanesulfonic acid, allylsulfonic acid, allyloxybenzenesulfonic acid, 2-hydroxy-3-(2-propenyloxy)propane-sulfonic acid, 2-methyl-2-propene-1-sulfonic acid, styrene sulfonic acid, vinyl sulfonic acid, 3-sulfopropyl acrylate, 3-sulfopropyl methacrylate and water-soluble salts thereof; (b) from 0 to 85 percent by weight of unsaturated monocarboxylic acid monomer selected from one or more of acrylic acid, methacrylic acid, crotonic acid, vinylacetic acid and water-soluble salts thereof; (c) from 0 to 80 percent by weight of unsaturated dicarboxylic acid monomer selected from one or more of maleic acid, maleic anhydride, fumaric acid, itaconic acid, citraconic acid, mesaconic acid, cyclohexenedicarboxylic acid, cis-1,2,3,6-tetrahydrophthalic anhydride, 3,6-epoxy-1, 2,3,6-tetrahydrophthalic anhydride and water-soluble salts thereof; and (d) from 0 to 20 percent by weight of unsaturated non-ionizable monomer; wherein the polymer has a weight average molecular weight of 1,000 to 20,000; wherein the aqueous fluid comprises inorganic ions selected from one or more of calcium, barium, strontium and sulfate ions; and wherein the aqueous fluid has a pH of 7.0 or less.

In another aspect the present invention provides a method for inhibiting metal sulfate salt scale formation in an aqueous fluid according to the aforementioned method further comprising injecting an aqueous solution of the water-soluble polymer into the underground petroleum-bearing formations via a well bore in fluid communication with the underground petroleum-bearing formations, the water-soluble polymer being adsorbed within a matrix of the underground petroleum-bearing formations and then desorbed from the matrix into the aqueous fluid.

In another aspect the present invention provides a method as described above further comprising injecting additional aqueous solution of the water-soluble polymer into the underground petroleum-bearing formations at time intervals selected to provide amounts of the water-soluble polymer effective to maintain scale inhibition.

DETAILED DESCRIPTION

We have found that certain low molecular weight polymers containing selected ratios of sulfonic acid and carboxylic acid monomer units provide unexpectedly improved performance in the stabilization of aqueous systems found in underground petroleum-bearing formations having low pH and high salt content as compared to the stabilization provided by conventional polycarboxylate and polyvinyl sulfonate polymers.

The polymer compositions found to be useful in the present invention contain units derived from at least two types of monomers: (1) carboxylic acid type and salts thereof, (2) sulfonic acid type and salts thereof and optionally (3) a unit derived from certain unsaturated non-ionizable type monomers. Water-soluble-salts of the polymer compositions, for example, the alkali metal salts (such as sodium or potassium), and the ammonium or substituted ammonium salts thereof, can also be used.

As used herein, the terms "(meth)acrylate" and "(meth) acrylamide" refer to either the corresponding acrylate or methacrylate and acrylamide or methacrylamide, respectively. Also, as used herein, the term "substituted" is used in conjunction with various (meth)acrylamides to indicate that one or both hydrogens attached to nitrogen of these compounds has been replaced, for example, with ($C_1$–$C_8$)alkyl or hydroxy($C_1$–$C_8$)alkyl groups. When the term "substituted" is used in conjunction with various alkyl (meth) acrylate esters it indicates that one or more hydrogens of the alkyl groups have been replaced, for example, with hydroxyl groups.

As used herein, all percentages referred to will be expressed in weight percent (%) unless specified otherwise. The phrase "inhibiting the precipitation" means the solubilization of scale-forming salts or reduction of the particle size or amount of precipitated scale-forming salts. The phrase "scale-forming salt" is meant to include, for example, calcium carbonate, calcium sulfate, barium sulfate, strontium sulfate and "NORM" scale salts. "NORM" refers to Naturally Occurring Radioactive Material; such materials may be hazardous if they are deposited on surface equipment. By "stabilization" we mean the combination of preventing precipitation of scale-forming salts and maintaining whatever precipitate that does form at a sufficiently small particle size (below about 0.45 microns) such that the precipitate particles do not normally deposit on surfaces such as liquid transfer lines or mineral surfaces found in reservoir formations.

The amount of unsaturated sulfonic acid units and salts thereof in the polymer composition can vary from 5 to 35%, preferably from 10 to 25% and more preferably from 10 to 20%. Unsaturated sulfonic acid monomers useful in this invention include, for example, 2-acrylamido-2-methyl-1-propanesulfonic acid (the acryonym "AMPS" for this monomer is a trademark of Lubrizol Corporation, Wickliffe, Ohio, U.S.A.), 2-methacrylamido-2-methyl-1-propanesulfonic acid, styrene sulfonic acid, vinyl sulfonic acid, 3-methacrylamido-2-hydroxy-1-propanesulfonic acid, allylsulfonic acid, allyloxybenzenesulfonic acid, 2-hydroxy-3-(2-propenyloxy)-propanesulfonic acid, 2-methyl-2-propene-1-sulfonic acid, 3-sulfopropyl acrylate, 3-sulfopropyl methacrylate and water-soluble salts thereof. Preferably, the unsaturated sulfonic acid units are those of 2-acrylamido-2-methyl-1-propanesulfonic acid, styrene sulfonic acid, vinyl sulfonic acid, 2-hydroxy-3-(2-propenyl-oxy) propanesulfonic acid and 2-methyl-2-propene-1-sulfonic acid. Preferred salts include, for example, sodium, potassium and ammonium salts.

"Unsaturated carboxylic acid monomer," as used herein, refers to unsaturated monocarboxylic acid monomers, unsaturated dicarboxylic acid monomers and any unsaturated monomer containing more than two carboxylic acid groups, e.g., polyacid.

"Unsaturated dicarboxylic acid monomer," as used herein, refers to unsaturated dicarboxylic acid monomers containing 4 to 10, preferably from 4 to 6, carbon atoms per molecule and anhydrides of the cis-dicarboxylic acids. Suitable unsaturated dicarboxylic acid monomers useful in the process of the present invention include, for example, maleic acid, maleic anhydride, fumaric acid, itaconic acid, citraconic acid, mesaconic acid, cyclohexenedicarboxylic acid, cis-1,2,3,6-tetrahydrophthalic anhydride (also known as cis-4-cylcohexene-1,2-dicarboxylic anhydride), 3,6-epoxy-1,2, 3,6-tetrahydrophthalic anhydride and water-soluble salts thereof. Preferred unsaturated dicarboxylic acid monomers are maleic acid and maleic anhydride. The amount of unsaturated dicarboxylic acid monomer units and salts thereof in the polymer composition can vary from 0 to 80%, preferably from 10 to 70%, more preferably from 30 to 60% and most preferably from 35 to 50%.

Suitable unsaturated monocarboxylic acid monomers are, for example, acrylic acid, oligomeric acrylic acid, methacrylic acid, crotonic acid, vinylacetic acid and the water-soluble salts thereof. Preferably, the unsaturated carboxylic monomer units are those of acrylic acid or methacrylic acid, and more preferably those of acrylic acid. Preferred salts include, for example, sodium, potassium and ammonium salts. The amount of unsaturated monocarboxylic acid monomer units and salts thereof in the polymer composition can vary from 0 to 85%, preferably from 5 to 70% and more preferably from 20 to 60%.

When used, the amount of optional unsaturated non-ionizable monomer units in the polymer composition can vary from 0 to 20% and more preferably from 0 to 10%. Optional unsaturated non-ionizable monomers useful in this invention include, for example, unsubstituted or substituted (meth)acrylamides such as ($C_1$–$C_8$)alkyl or hydroxy($C_1$–$C_8$) alkyl methacrylamides and ($C_1$–$C_8$)alkyl or hydroxy-($C_1$–$C_8$)acrylamides; unsubstituted or substituted (meth) acrylate esters such as ($C_1$–$C_8$)alkyl or hydroxy($C_1$–$C_8$) methacrylates and ($C_1$–$C_8$)alkyl or hydroxy($C_1$–$C_8$)-acrylates; vinyl acetate and hydrolyzed vinyl acetate; and aromatic hydrocarbon monomers such as styrene and vinyltoluene. Preferably, the optional unsaturated non-ionizable monomer units are those of one or more of tert-butylacrylamide, acrylamide, vinyl acetate, vinyl alcohol, styrene, ethyl acrylate, butyl acrylate, butyl methacrylate, hydroxyethyl methacrylate and hydroxypropyl acrylate.

In a preferred embodiment of the present invention, the water-soluble polymer comprises monomer units of 10 to 20% of the unsaturated sulfonic acid monomer and from 80 to 90% of one or more of unsaturated monocarboxylic acid or dicarboxylic acid monomers. In a more preferred embodiment, the water-soluble polymer comprises 10 to 15% of 2-acrylamido-2-methyl-1-propanesulfonic acid monomer units or salts thereof, 15 to 65% of acrylic acid monomer units or salts thereof and 25 to 70% of maleic acid or maleic anhydride monomer units or salts thereof.

The polymer compositions useful in the process of the invention, containing the selected units in the selected weight ratios, have weight average molecular weights ($M_w$) ranging from about 1,000 to about 20,000, preferably from 1,500 to 10,000, and most preferably from 2,000 to 7,000. Weight average molecular weights are based on gel permeation chromatography (GPC) analysis using known poly(meth)acrylic acid standards.

Water flooding is a commonly used technique in oil recovery operations. Water is injected under pressure into the formation water reservoir via injection wells; this procedure drives the oil through the mineral deposits and rock formations into the production wells. Sea water, readily available in offshore operations, and typically used for the injection water in the water flooding operation, contains large amounts of dissolved salts, such as sulfate. Interaction of the injection water (in the absence of effective scale inhibitors) with the formation water in the reservoir will produce unwanted inorganic deposits (primarily scale-forming salts of calcium sulfate, barium sulfate and strontium sulfate) which ultimately block tubing, valves and pumps of the oil recovery process equipment. Additional conditions that aggravate the deposition of scale-forming salts include low pH, pressure, high temperatures and high concentrations of barium, strontium, calcium or iron ions encountered in typical oil recovery operations.

In order to address the scale-formation problem, a "squeeze" process is used. Generally, the well is initially preflushed with sea water, then a scale inhibitor-containing injection step is performed; this is followed by an additional sea water feed (over flush step) to distribute the scale inhibitor further into the reservoir to be adsorbed within the mineral deposits and rock formations (matrix of the underground petroleum-bearing formation). During the squeeze treatment, oil recovery operations are curtailed. When oil production operations are resumed, the adsorbed scale inhibitor will be slowly released (desorbed or dissolved) from the formation matrix and prevent the precipitation of scale-forming salts during subsequent oil recovery operations. For oilfields characterized by "harsh" conditions (such as high barium levels or low pH), typical time periods before additional squeeze treatments are required (squeeze lifetime) are 1 to 6 months; desired squeeze lifetimes are 6 to 24 months, preferably 12 to 24 months or longer. The harsher the conditions, the greater the tendency for metal sulfate scale formation with consequent plugging and fouling of the oilfield matrix and oil production equipment.

An aqueous solution of the scale inhibitor is used in the injection step; typically the concentration of scale inhibitor is from 0.5 to 20%, and preferably from 2 to 10% by weight of the aqueous solution. When the production water from the oilwell begins to show decreased levels of the scale inhibitor further squeeze treatments will be required. Generally, effective scale inhibition will be maintained at levels of inhibitor above about 25 ppm (in the production water or in the formation water). The more effective the scale inhibitor, the lower the level can be of scale inhibitor in the production water before requiring additional treatment. Inhibitors identified for use in the process of the present invention may allow the levels to be dropped to 10 to 20 ppm, and more preferably to 5 to 10 ppm, before additional treatment is required. Use of the water-soluble polymers described for use in the process invention allow for the lower use levels to be tolerated before repeating the squeeze treatment, thus extending the squeeze lifetime beyond that available with prior art scale inhibitors. The repeat treatment involves injecting additional aqueous solution of the water-soluble polymer into the underground petroleum-bearing formations at time intervals selected to provide amounts of the water-soluble polymer effective to maintain scale inhibition.

Harsh conditions can be defined in a variety of ways depending upon the particular combinations of pH and background cation and anion concentrations in the waters being treated with scale inhibitor. In general, harsh oilfield conditions refer to waters having a pH from about 3 to about 7, where the barium, calcium, strontium and sulfate ions are present in amounts from 100 to 2000 parts per million (ppm), 300 to 35000 ppm, 100 to 1000 ppm and 500 to 5000 ppm, respectively, where the amounts are ppm by weight of the aqueous fluid. Generally, the harsh oilfield conditions will be represented by waters having a pH from about 4 to about 6, typically of about 5.0 or less, where the barium, calcium, strontium and sulfate ions are present in amounts from 300 to 1500 ppm, 1000 to 3000 ppm, 200 to 500 ppm and 1000 to 3000 ppm, respectively.

Particularly harsh conditions may be represented by the following examples, but are not limited to these particular conditions:

(a) water having a pH of about 4, with a relatively low barium ion concentration of 100–150 ppm and a sulfate ion concentration of about 1000–1500 ppm.

(b) water having a pH of about 4, with a relatively high barium ion concentration of 500–1000 ppm or more and a relatively low sulfate ion concentration of less than about 600 ppm.

(c) water having a pH of about 5.5, with a relatively high barium ion concentration of 500–1000 ppm or more and a sulfate ion concentration of greater than 1000 ppm.

Metal sulfate scale precipitation as a problem in oilfield recovery operations is represented by a combination of the different types of metal sulfate scale (for example, barium sulfate, calcium sulfate, strontium sulfate and NORM scale salts). However, barium sulfate scale represents the predominant scale problem in most oilfields and is considered representative of the other types of scale in terms of evaluations of scale inhibitor systems developed to prevent and minimize scale formation. Therefore, laboratory scale inhibition efficiency based on barium sulfate inhibition is considered to also address the ability of the scale inhibitors to control the other forms of metal sulfate scale.

Several classes of materials have been used as scale inhibitors for squeeze treatments, such as phosphonate compounds, poly(acrylic acid) polymers and sulfonated polymers. Each type has been moderately effective at inhibiting scale, but no single type satisfies all the desirable characteristics of an ideal squeeze treatment scale inhibitor. Three key performance properties of a squeeze treatment scale inhibitor are (1) satisfactory scale inhibition of sulfate salts of calcium, barium and strontium at low use levels of the inhibitor, (2) compatibility with the sea water used in the injection step and preferably with the formation water and (3) satisfactory adsorption-desorption characteristics within the formation matrix that allow slow and homogeneous release into the surrounding water at concentrations effective to maintain inhibition of scale formation.

Commercially available scale inhibitors include: phosphinocarboxylic acid polymers based on phosphinate-containing poly(acrylic acid)—mixture of dialkyl phosphinate and monoalkyl phosphinate, diethylenetriaminepentamethylene-phosphonic acid (DETPMP) as a representative phosphonate compound and poly(sodium vinyl sulfonate), or P(SVS), as a representative sulfonated polymer. High phosphorus-containing scale-inhibitors, such as DETPMP, while generally effective scale inhibitors are less desirable in many situations due to the environmental problems encountered with their continued use.

Abbreviations used in the Examples and Tables are listed below with corresponding descriptions.

| | |
|---|---|
| AA | Acrylic Acid |
| AMPS | 2-Acrylamido-2-methyl-1-propanesulfonic Acid |
| DETPMP | Diethylenetriaminepentamethylenephosphonic acid |
| HPOPS | 2-Hydroxy-3-(2-propenyloxy)propanesulfonic acid |
| MAA | Methacrylic Acid |
| MALAC | Maleic Acid |
| SVS | Sodium Vinyl Sulfonate |
| SSS | Sodium Styrene Sulfonate |

Table I contains a summary of various types of scale inhibitors. Scale inhibitors 1 through 9 are representative of prior art barium sulfate scale inhibitors that are used commercially; scale inhibitors 10 through 18 are representative of polymers useful in the process of the present invention. Scale inhibitor 3 is a commercial material (mixture of dialkyl and monoalkyl phosphino poly(acrylic acid)), available as Bellasol™ S40 from FMC Corporation. Scale inhibitor 4 is a commercial material, available as Dequest™2060 from Monsanto Co. Scale inhibitor 5 is a commercial material, available as Scaletreat™ 810 obtained from TR Oil Services. Scale inhibitor 6 is a commercial material similar to scale inhibitor 5.

TABLE I

Barium Sulfate Scale Inhibitors

| Scale Inhibitor | $M_w$ |
|---|---|
| 1 P(AA) | 2000 |
| 2 P(AA) | 4500 |
| 3 P(AA) | 3160 |
| 4 DETPMP | 573 |
| 5 P(SVS) | 7300 |
| 6 P(SVS) | 6680 |
| 7 P(60 AA/40 AMPS) | 11000 |
| 8 P(70 AA/30 MAA) | 3500 |
| 9 P(MALAC) | 1000 |
| 10 P(65 AA/25 MALAC/10 AMPS) | 3500 |
| 11 P(60 AA/30 MALAC/10 AMPS) | 3540 |
| 12 P(50 AA/40 MALAC/10 AMPS) | 6960 |
| 13 P(30 AA/60 MALAC/10 AMPS) | 3970 |
| 14 P(15 AA/70 MALAC/15 AMPS) | 2750 |
| 15 P(30 AA/60 MALAC/10 HPOPS) | 4730 |
| 16 P(40 AA/50 MALAC/10 SVS) | 4710 |
| 17 P(35 AA/60 MALAC/5 SSS) | 5200 |
| 18 P(77 AA/23 AMPS) | 4500 |

These classes of scale inhibitors provide adequate scale inhibition with formation waters representing "moderate" conditions, that is, combination of a pH of 5.0 to 6.6 with moderate concentrations of calcium, barium and strontium ions, as exemplified by "Forties" field water (see Example 2 for water compositions). A more stringent evaluation of potential scale inhibitors requires determining their performance under harsher conditions than those described above for moderate conditions. "Harsh" conditions combine a pH below about 5.5 and high levels of barium and sulfate ions in the test waters, as exemplified by "Froy" field water (see Example 2 water compositions). Test conditions for barium sulfate inhibition (static jar test) were: 20/80 and 50/50 synthetic sea water (SSW)/formation water ("Froy" field water) @95° C./pH 4.2/test duration of 2 and 22 hours/ dosage of 5, 10, 15, 25 ppm scale inhibitor material (active). See Examples 3A, 3B and 3C for experimental details.

TABLE 2

Barium Sulfate Inhibition under Harsh Conditions:
95° C., pH 4.2, 20/80 SSW/"Froy" Formation Water

| | % BaSO₄ inhibition (2/22 hours) | | |
|---|---|---|---|
| Scale Inhibitor | @ 10/15/25 ppm dosage | | |
| 10 P(65 AA/25 MALAC/10 AMPS) | 33/36 | 57/59 | 70/67 |
| 14 P(15 AA/70 MALAC/15 AMPS) | 22/25 | 44/40 | 56/53 |
| 3 P(AA) | 41/31 | 54/36 | 65/34 |
| 5 P(SVS) | 30/32 | 44/44 | 58/48 |

TABLE 3

Barium Sulfate Inhibition under Harsh Conditions:
75° C., pH 4.2, 20/80 SSW/"Froy" Formation Water

| Scale Inhibitor | % BaSO₄ inhibition (2/22 hours) @ 25 ppm dosage |
|---|---|
| 10 P(65 AA/25 MALAC/10 AMPS) | 65/62 |
| 14 P(15 AA/70 MALAC/15 AMPS) | 56/54 |
| 3 P(AA) | 66/38 |
| 5 P(SVS) | 58/48 |

TABLE 4

Barium Sulfate Inhibition under Harsh Conditions:
95° C., pH 4.2, 20/80 SSW/"Froy" Formation Water

| Scale Inhibitor | % BaSO₄ inhibition (2/22 hours) @ 25 ppm dosage |
|---|---|
| 10 P(65 AA/25 MALAC/10 AMPS) | 57/52 |
| 14 P(15 AA/70 MALAC/15 AMPS) | 44/41 |
| 3 P(AA) | 55/31 |
| 5 P(SVS) | 39/41 |

TABLE 5

Barium Sulfate Inhibition under Harsh Conditions:
75° C., pH 4.2, 50/50 SSW/"Froy" Formation Water

| | % BaSO₄ inhibition (2/22 hours) | | |
|---|---|---|---|
| Scale Inhibitor | @ 25/50/75 ppm dosage | | |
| 10 P(65 AA/25 MALAC/10 AMPS) | 14/3 | 31/5 | 41/5 |
| 14 P(15 AA/70 MALAC/15 AMPS) | 29/23 | 52/30 | 66/32 |
| 3 P(AA) | 2/1 | 2/0 | 5/0 |
| 5 P(SVS) | 23/9 | 35/9 | 44/9 |

TABLE 6

Barium Sulfate Inhibition under Harsh Conditions:
95° C., pH 4.2, 50/50 SSW/"Froy" Formation Water

| | % BaSO₄ inhibition (2/22 hours) | | |
|---|---|---|---|
| Scale Inhibitor | @ 25/50/75 ppm dosage | | |
| 10 P(65 AA/25 MALAC/10 AMPS) | 18/5 | 33/8 | 45/9 |
| 14 P(15 AA/70 MALAC/15 AMPS) | 19/14 | 41/28 | 54/30 |
| 3 P(AA) | 12/2 | 20/3 | 27/5 |
| 5 P(SVS) | 15/5 | 28/7 | 33/7 |

TABLE 6A

Barium Sulfate Inhibition under Harsh Conditions:
90° C., pH 5.5, 50/50 SSW/"Froy" Formation Water

| Scale Inhibitor | % BaSO₄ inhibition (24 hours) @ 300 ppm dosage |
| --- | --- |
| 15 P(30 AA/60 MALAC/10 HPOPS) | 31 |
| 11 P(60 AA/30 MALAC/10 AMPS) | 58 |
| 6 P(SVS) | 46 |

TABLE 6B

Barium Sulfate Inhibition under Harsh Conditions:
90° C., pH 4.0, 50/50 SSW/"Forties" Formation Water

| Scale Inhibitor | % BaSO₄ inhibition (18 hours) @ 30 ppm dosage |
| --- | --- |
| 1 P(AA) | 3 |
| 2 P(AA) | 17 |
| 13 P(30 AA/60 MALAC/10 AMPS) | 97 |
| 12 P(50 AA/40 MALAC/10 AMPS) | 80 |
| 16 P(40 AA/50 MALAC/10 SVS) | 77 |
| 17 P(35 AA/60 MALAC/5 SSS) | 96 |

Another aspect of harsh scale inhibition conditions is an evaluation of performance under dynamic rather than static conditions, that is, how the scale inhibitors perform in preventing blockage of narrow passages due to scale deposition, such as would occur in transport lines and tubing. This performance characteristic was evaluated via a capillary tube test (see Example 3D for description of test and apparatus) at conditions listed in Table 7. The better performance under these test condition is represented by longer times before plugging. The polymers useful in the process of the present invention (10, 14 and 18) provide enhanced scale inhibition under these dynamic conditions when compared to other commercially scale inhibitors.

TABLE 7

Barium Sulfate Inhibition under Harsh Conditions:
Dynamic Capillary Tube Plugging Test @ pressure = 1 bar
Scale inhibitor dosage = 8 ppm
90° C., pH 4.0, 50/50 SSW/"PMAC" Formation Water

| Scale Inhibitor | $M_w$ | Time Before Plugging (minutes) |
| --- | --- | --- |
| Control (no scale inhibitor) | — | 60 |
| 9 P(MALAC) | 1000 | 86 |
| 3 P(AA) | 3200 | 120 |
| 4 DETPMP | 573 | 110 |
| 18 P(77 AA/23 AMPS) | 4500 | 360 |
| 7 P(60 AA/40 AMPS) | 11000 | 180 |
| 14 P(15 AA/70 MALAC/15 AMPS) | 2750 | >480 |
| 10 P(65 AA/25 MALAC/10 AMPS) | 3500 | 307 |

Evaluation of adsorption characteristics of the above scale inhibitors was conducted in a manner to simulate actual conditions encountered in a reservoir. Although actual temperatures may be as high as 120° C. in the reservoir, laboratory evaluations used 95° C. for operational convenience, with the expectation that adsorption capability would be more difficult to achieve at the lower temperature, thus amplifying any differences among scale inhibitor candidates. The adsorption tests were run under static conditions using stock solutions of synthetic sea water containing 2500 ppm of the scale inhibitors, each solution adjusted with 10% aqueous HCl or 1N or 10N aqueous NaOH to a pH of 3.0, 4.0, 5.0 and 6.0. See Example 4 for experimental conditions.

Test results are presented in Table 8. As shown in the Table, polymers used in the process of the present invention (10 and 14) provide significantly enhanced adsorption potential when compared to the commercial poly(SVS) scale inhibitor (5).

TABLE 8

Scale Inhibitor Static Adsorption
(milligrams adsorbed/gram of rocks)

| Scale Inhibitor | Adsorption (mg/g) @ pH = 3.0/4.0/5.0/6.0 | | | |
| --- | --- | --- | --- | --- |
| 10 P(65 AA/25 MALAC/10 AMPS) | 2.2 | 2.2 | 2.8 | 2.6 |
| 14 P(15 AA/70 MALAC/15 AMPS) | 4.0 | 4.0 | 4.4 | 4.2 |
| 3 P(AA) | 2.4 | 2.2 | 2.2 | 2.2 |
| 5 P(SVS) | 0.4 | 1.0 | 0.6 | 0.3 |

Evaluation of compatibility characteristics of scale inhibitors with delivery water (synthetic sea water) indicated that the phosphinate-containing poly(acrylic acid) inhibitor, the P(SVS) inhibitor and the water-soluble polymers useful in the process of the present invention would all perform very similarly regarding compatibility, that is, these classes of scale inhibitors would all have satisfactory compatibility with typical delivery waters used in the injection step ("squeeze" process). Compatibility test conditions typically involved preparing the test solutions (containing 0.1 to 10% by weight of scale inhibitor in the sea water adjusted to pH 3.8) in thick walled glass bottles and raising the temperature from ambient temperature to 100° C. by heated forced air; the temperature at which precipitation occurred was then noted.

Tables 2 through 7 illustrate various "harsh" condition environments and the relative performance of the water-soluble polymers useful in the present invention. In some cases, the performance of the scale inhibitors of the prior art and those of the present invention are similar; however, in many cases the more severe conditions indicate the greater degree of scale inhibition efficiency obtained with the polymers of the present invention. In particular, Tables 5 and 6 illustrate the advantage of the present invention over the use of P(AA) materials, especially at extended time periods. When the adsorption characteristics of the polymers of the present invention (Table 8) are combined with their scale inhibiting properties, there is a clear advantage in expected long term performance, such as extended squeeze lifetimes, over prior art scale inhibitors represented by the poly (sodium vinylsulfonate) type (scale inhibitors 5 and 6).

While not wishing to be bound by theory, we believe that the efficacy of the water-soluble polymers useful in the process of the present invention is due to contributions from each of the functional group types present in the polymer. Sulfonic acid units are believed to enhance compatibility of the scale inhibitor with seawater due to the high ionization constant of the sulfonic acid group; the sulfonic acid group has little affinity for metal ions and provides high water solubility. Carboxylic acid units contributed by the unsaturated carboxylic acid monomers provide enhanced adsorption of the scale inhibitor due to the high affinity of the carboxyl group for metal ions (such as those found in the mineral surfaces of oil reservoir formations). This last feature also contributes to the scale inhibition effectiveness of the water-soluble polymer via attachment to metal ions. We also believe that the balance between different types of carboxylic acid functional groups (such as acrylic acid and maleic acid type) provides the required combination of scale inhibitor adsorption (distribution within the formation water matrix) and desorption (release to operate over extended periods of time) properties.

Some embodiments of the invention are described in detail in the following Examples. All ratios, parts and percentages (%) are expressed by weight unless otherwise specified, and all reagents used are of good commercial quality unless otherwise specified.

EXAMPLE 1

Synthesis of Polymer Compositions

The polymers useful in the present invention can be made by methods of polymerization well known to those skilled in the art. They can be prepared by aqueous polymerization, solvent polymerization or bulk polymerization. Preferably they are prepared by aqueous polymerization. The polymerizations can be conducted as batch, cofeed, heel, semi-continuous or continuous processes. Preferably the polymerization is conducted as a cofeed or continuous process.

When the polymers are prepared by a cofeed process, the initiator and monomers are generally introduced into the reaction mixture as separate streams which are fed linearly, i.e., at constant rates. The streams may be staggered so that one or more of the streams are completely fed before the others. Also, a portion of the monomers or initiators may be added to the reactor before the feeds are begun. The monomers may be fed into the reaction mixture as individual streams or combined into one or more streams.

The initiators suitable for making the polymers of the present invention are any of the conventional water-soluble free-radical initiators and redox couples. Suitable free-radical initiators include, for example, peroxides, persulfates, peresters and azo initiators. Mixed initiator systems (redox couple) can also be used, such as combination of a free radical initiator with a reducing agent. Suitable reducing agents include, for example, sodium bisulfite, sodium sulfite, hypophosphite, isoascorbic acid and sodium formaldehyde-sulfoxylate. The level of initiator is generally 0.1 to 20% based on the total weight of polymerizable monomers. Preferably the initiator is present at a level from 1 to 15% and most preferably from 2 to 10% based on the total weight of polymerizable monomer.

In addition to the initiator, one or more promoters may also be used. Suitable promoters include water-soluble salts of metal ions. Suitable metal ions include iron, copper, cobalt, manganese, vanadium and nickel. Preferably the promoters are water-soluble salts of iron or copper. When used, the promoters are present at levels from about 1 to about 100 ppm based on the total amount of polymerizable monomer. Preferably the promoters are present at levels from about 3 to about 20 ppm based on the total polymerizable monomers.

It is generally desirable to control the pH of the polymerizing monomer mixture, especially when using thermal initiators such as persulfate salts. The pH of the polymerizing monomer mixture can be controlled by a buffer system or by the addition of a suitable acid or base; the pH of the system is maintained from about 3 to about 8, and preferably from about 4 to about 6.5. Similarly, when redox couples are used there will be an optimum pH range in which to conduct the polymerization depending on the choice of the components of the redox couple. The pH of the system can be adjusted to suit the choice of the redox couple by the addition of an effective amount of a suitable acid or base.

When the polymerization is conducted as a solution polymerization using a solvent other than water, the reaction should be conducted at up to about 70%, preferably from 40 to 60%, by weight of polymerizable monomers based on the total reaction mixture. Similarly, when the polymerization is conducted as an aqueous polymerization, the reaction should be conducted at up to about 70%, preferably from 40 to 60%, by weight of polymerizable monomers based on the total reaction mixture. In general it is preferred to conduct the polymerizations as aqueous polymerizations. The solvents or water, if used, can be introduced into the reaction vessel as a heel charge, or can be fed into the reactor either as a separate feed stream or as a diluent for one of the other components being fed into the reactor.

The temperature of the polymerization reaction will depend on the choice of initiator, solvent and target molecular weight. Generally the temperature of the polymerization is up to the boiling point of the system although the polymerization can be conducted under pressure if higher temperatures are used. Preferably the temperature of the polymerization is from about 50° to about 95° C. and most preferably from 60° to 80° C.

Chain regulators or chain transfer agents may be employed to assist in controlling the molecular weight of the polymers. Any conventional water-soluble chain regulator or chain transfer agent can be used. Suitable chain regulators include, for example, mercaptans, hypophosphites, phosphites, isoascorbic acid, alcohols, aldehydes, hydrosulfites and bisulfites. If a chain regulator or chain transfer agent is used, preferred mercaptans are 2-mercaptoethanol and 3-mercaptopropionic acid; a preferred bisulfite is sodium metabisulfite; a preferred phosphite is sodium phosphite.

EXAMPLE 2

Water Compositions

Test solutions and makeup waters were prepared by dissolving the appropriate metal salts in deionized water and filtering through 0.45 micron pore size filters prior to use. Final component concentrations of the various "waters" are indicated below in Table 9. Synthetic Sea Water is meant to correspond to North Sea Brine; four variations of Synthetic Sea Water were used. Their use is noted at appropriate locations in Example 3. Synthetic "Forties," "Froy" and "Miller," Formation Waters are meant to simulate brines from the Forties and Miller Formations of the North Sea. The "PMAC" Formation Water is used in Example 3D.

TABLE 9

Water Compositions
(amounts in ppm (milligrams/liter) based on volume of solution)

| Component | SSW-1 | SSW-2 | SSW-3 | SSW-4 | "Forties" | "Froy" | "Miller" | "PMAC" |
|---|---|---|---|---|---|---|---|---|
| Sodium | 10890 | 10890 | 10890 | 11035 | 29371 | 36000 | 36500 | 16100 |
| Potassium | 462 | 460 | 460 | 397 | 372 | 2500 | 2510 | 246 |
| Magnesium | 1368 | 1368 | 1368 | 1330 | 504 | 200 | 212 | 132 |
| Calcium | 428 | 428 | 428 | 418 | 2811 | 2100 | 2110 | 504 |
| Strontium | 8 | — | 8 | — | 573 | 450 | 453 | 180 |
| Barium | — | — | — | — | 252 | 1000 | 1070 | 200 |
| Chloride | 19700 | 19766 | 19700 | 19841 | 52369 | 65000 | 65300 | 26800 |
| Sulfate | 2960 | 2960 | 2700 | 2769 | 11 | — | — | — |
| Bicarbonate | 124 | — | 124 | 146 | 498 | — | — | 512 |
| Acetate | — | — | — | — | — | — | — | 460 |

Components are listed as the ionic form.
Synthetic Sea Water designated as SSW
Formation Water designated as "Forties," "Froy," "Miller," "PMAC"

EXAMPLE 3A

Test Method for Barium Sulfate Inhibition "Miller" Formation Water

The polymers prepared by the process of the present invention were tested for their ability to inhibit barium sulfate scale formation. The test method for measuring inhibition of barium sulfate consisted of the following steps: (1) preparation of test solutions containing the polymer to be tested, (2) incubation of the test solutions and (3) measurement of the amount of barium which did not precipitate in the test solutions. Accordingly, in comparing two test solutions, the test solution having the higher percent barium sulfate inhibition contains a scale inhibitor which is more effective in inhibiting metal sulfate scale formation.

The test solutions were prepared from a barium-containing solution, a sulfate-containing solution, a buffer solution, and an inhibitor solution containing the polymer to be tested; the concentration of polymer in the inhibitor solution was expressed as grams of polymer in the free acid (H) form. The composition of the barium- and sulfate-containing solutions is shown in Table 10.

TABLE 10

Composition of Barium- and Sulfate-Containing Solutions

| Barium-Containing Solution | | Sulfate-Containing Solution | |
|---|---|---|---|
| Component | grams/liter | Component | grams/liter |
| NaCl | 59.574 | NaCl | 59.574 |
| KCl | 5.663 | $Na_2SO_4$ | 3.993 |
| $CaCl_2.2H_2O$ | 9.310 | $NaHCO_3$ | 0.171 |
| $MgCl_2.6H_2O$ | 13.209 | Deionized water | balance |
| $BaCl_2.2H_2O$ | 1.903 | | |
| $SrCl_2.6H_2O$ | 1.402 | | |
| Deionized water | balance | | |

Table 9 gives the compositions of formation water "Miller" and sea water (SSW-3) that are simulated by the barium- and sulfate-containing solutions listed in Table 10. Rather than make up a sea water and a formation water having the compositions listed in Table 9, two waters were made as in Table 10 with potassium and divalent cations in the barium-containing solution and sulfate and bicarbonate in the sulfate-containing solution. The sodium chloride was equally distributed between the two solutions. When the barium- and sulfate-containing solutions of Table 10 were mixed in a 50/50 ratio, the resulting mixture had the same ionic composition as if SSW-3 and "Miller" formation water from Table 9 were mixed in a 50/50 ratio.

The barium- and sulfate-containing solutions of Table 10 were filtered through a 0.45 micron filter. The barium containing solution was adjusted to pH 4.2 with dilute HCl, and the sulfate-containing solution was adjusted to pH 6.0 with dilute HCl.

Compositions of the buffer and inhibitor solutions were as follows:

| Component | Concentration |
|---|---|
| Buffer Solution | |
| $CH_3COONa.3H2O$ | 22.78 g/100 ml solution |
| $CH_3COOH$ | 0.574 g/100 ml solution |
| Deionized water | Balance |
| Inhibitor Solution | |
| Scale inhibitor to be tested | 10 g/liter |
| Deionized water | Balance |

The inhibitor solution was adjusted to a pH of 6.0 with dilute HCl or dilute NaOH.

The test solutions containing a polymer to be tested, hereinafter called the "inhibitor test solution," were prepared by combining 2 ml of the buffer solution, 50 ml of the sulfate-containing solution, 3.15 ml of inhibitor solution, and 50 ml of the barium-containing solution.

As controls, a "no inhibitor" test solution, a sulfate test solution and a barium test solution were prepared. The "no inhibitor" test solution was prepared by combining 2 ml of the buffer solution, 50 ml of the sulfate-containing solution, 50 ml of the barium-containing solution, and 3.15 ml of deionized water. The sulfate test solution was prepared by combining 2 ml of the buffer solution, 100 ml of the sulfate-containing solution, and 3.15 ml of deionized water. The barium test solution was prepared by combining 2 ml of the buffer solution, 100 ml of the barium containing solution, and 3.15 ml of deionized water.

The inhibitor, no inhibitor, sulfate, and barium test solutions were placed in a water bath at 90° C. and gently shaken for 24 hours. After the 24 hour incubation period, the test solutions were removed one at a time from the water bath and a diluted test solution was prepared from each test solution for analyzing barium content. The diluted test solution was prepared by adding to a 100 ml flask the following ingredients in the order listed:

(1) 50 ml of EDTA solution (2) 1–2 ml of supernatant taken from the incubated test solution (3) EDTA solution (balance to make 100 ml)

The EDTA solution consisted of 6.00 g of KCl, 72.8 g of $K_2EDTA \cdot 2H_2O$, and 1800 g of deionized water. The pH of the solution was adjusted to 12 with KOH pellets, and then sufficient deionized water was added to make the total solution weight equal to 2000 g.

The diluted test solutions were measured for barium using direct current plasma on a Spectra Span 7 DCP Spectrometer manufactured by Applied Research Laboratories Fisons located in Valencia, Calif. The concentration of the barium in the undiluted test solutions was calculated from the measured values of barium. The percent barium sulfate inhibition was obtained from the following formula:

$$\text{Percent BaSO}_4 \text{ Inhibition} = \frac{100 \times [\text{Ba Inhibitor} - \text{Ba No Inhibitor}]}{0.5 \times [\text{Ba Barium} + \text{Ba Sulfate}] - \text{Ba No Inhibitor}}$$

where:

Ba Inhibitor=concentration of barium in inhibitor solution

Ba No Inhibitor=concentration of barium in no inhibitor solution

Ba Barium=concentration of barium in barium test solution

Ba Sulfate=concentration of barium in sulfate test solution

EXAMPLE 3B

Test Method for Barium Sulfate Inhibition "Forties" Formation Water

The procedure used was the same as that for the "Miller" formation water with the following exceptions:

TABLE 11

| Composition of Barium- and Sulfate-Containing Solutions | | | |
|---|---|---|---|
| Barium-Containing Solution | | Sulfate-Containing Solution | |
| Component | grams/liter | Component | grams/liter |
| NaCl | 74.17 | NaCl | 23.955 |
| KCl | 0.71 | KCl | 0.88 |
| $CaCl_2 \cdot 2H_2O$ | 10.31 | $CaCl_2 \cdot 2H_2O$ | 1.57 |
| $MgCl_2 \cdot 6H_2O$ | 4.215 | $MgCl_2 \cdot 6H_2O$ | 11.44 |
| $BaCl_2 \cdot 2H_2O$ | 0.448 | $SrCl_2 \cdot 6H_2O$ | 0.0243 |
| $SrCl_2 \cdot 6H_2O$ | 1.745 | $Na_2SO_4$ | 4.375 |
| $Na_2SO_4$ | 0.017 | $NaHCO_3$ | 0.17 |
| $NaHCO_3$ | 0.685 | Deionized water | balance |
| Deionized water | balance | | |

Table 9 gives the compositions of formation water ("Forties") and sea water (SSW-1) that are duplicated by the barium- and sulfate-containing solutions listed above.

Carbon dioxide was bubbled for two hours through the barium- and sulfate-containing solutions, the solutions were filtered through a 0.45 micron filter, then each was adjusted to pH 4.0 with 15% HCl.

No buffer was used. Compositions of inhibitor solutions were as follows:

| Inhibitor Solution | |
|---|---|
| Component | Concentration |
| Scale inhibitor to be tested | 1 g/liter |
| Deionized water | Balance |

The inhibitor solution was adjusted to a pH of 5.5 with dilute HCl or dilute NaOH.

The inhibitor test solutions were prepared by combining 50 ml of the sulfate-containing solution, 3 ml of inhibitor solution, and 50 ml of the barium-containing solution.

A no inhibitor test solution was prepared by combining 50 ml of the sulfate-containing solution, 3 ml of deionized water, and 50 ml of the barium-containing solution. A barium test solution was prepared by combining 50 ml of the barium-containing solution and 53 ml of deionized water.

The test solutions were placed in a water bath at 90° C. and gently shaken for 24 hours. After the 24 hour incubation period, the test solutions were removed one at a time from the water bath and a diluted test solution was prepared from each test solution for analyzing barium content. The diluted test solution was prepared by adding 10 ml of supernatant from the incubated test solution to a 100 ml flask. The balance of the 100 ml was made up with deionized water.

The diluted test solutions were measured for barium using inductively coupled plasma. The concentration of barium in the undiluted test solutions was calculated from the measured values of barium. The percent barium sulfate inhibition was obtained from the following formula:

$$\text{Percent BaSO}_4 \text{ inhibition} = \frac{100 \times \text{concentration of barium in inhibitor test solution}}{\text{concentration of barium in barium test solution}}$$

EXAMPLE 3C

Test Method for Barium Sulfate Inhibition "Froy" Formation Water

The procedure used follows the same general principles as that for the "Miller" formation water test. The details of the "Froy" formation water tests are given below:

TABLE 12

| Composition of Barium- and Sulfate-Containing Solutions | | | |
|---|---|---|---|
| Barium-Containing Solution | | Sulfate-Containing Solution | |
| Component | grams/liter | Component | grams/liter |
| NaCl | 91.511 | NaCl | 24.074 |
| KCl | 4.766 | KCl | 0.877 |
| $CaCl_2 \cdot 2H_2O$ | 7.703 | $CaCl_2 \cdot 2H_2O$ | 1.570 |
| $MgCl_2 \cdot 6H_2O$ | 1.672 | $MgCl_2 \cdot 6H_2O$ | 11.436 |
| $BaCl_2 \cdot 2H_2O$ | 1.779 | $Na_2SO_4$ | 4.376 |
| $SrCl_2 \cdot 6H_2O$ | 1.369 | Deionized water | balance |
| Deionized water | balance | | |

Table 9 gives the compositions of formation water ("Froy") and sea water (SSW-2) that are duplicated by the barium- and sulfate-containing solutions listed above.

The concentration of polymer in the inhibitor solution was expressed as grams of polymer in the free acid (H) form. Compositions of inhibitor solutions and the buffer solution were as follows:

| Buffer Solution | |
| --- | --- |
| Component | Concentration |
| CH$_3$COONa.3H$_2$O | 13.60 g/100 ml solution |
| CH$_3$COOH | 6.00 g/100 ml solution |
| Deionized water ph 4.2–4.3 | Balance |

The inhibitor solution is then diluted further into the sulfate-containing solution in order to give the required concentration for the particular test. The concentration of inhibitor in the sulfate-containing solution must be higher than that required for the test by a factor which accounts for the dilution when mixed with the barium-containing solution.

The barium-containing solution and the inhibitor/sulfate-containing solution were filtered separately through a 0.45 micron filter, collecting in separate containers a sufficient volume of each to equal a total of 200 ml on mixing the two.* 2 ml of buffer solution was then added to the inhibitor/sulfate-containing solution. Both solutions were then placed into a water bath at the test temperature (75° C. or 95° C.) for 60 minutes.

*For a 50/50 sea water/formation water ratio, 100 ml of inhibitor/sulfate-containing solution and 100 ml of barium-containing solution were collected. For a 20/80 sea water/formation water ratio, 40 ml of inhibitor/sulfate-containing solution and 160 ml of barium-containing solution were collected.

After 60 minutes at the test temperature, the two solutions were mixed by pouring the barium-containing solution into the buffer/inhibitor/sulfate-containing solution and shaking. The inhibitor test solution (approx. 200 ml) was returned to the water bath for 2 or 22 hours.

A no inhibitor test solution was prepared as above by using a buffer/sulfate-containing solution in place of the buffer/inhibitor/sulfate-containing solution. A barium test solution was prepared as above by using a buffer/deionized water solution in place of the buffer/inhibitor/sulfate-containing solution.

After the 2 or 22 hour incubation period, the test solutions were removed one at a time from the water bath and a diluted test solution was prepared from each test solution for analyzing barium content. The diluted test solution was prepared by adding 1 ml of supernatant from the incubated test solution to 19 ml of stabilization solution. The stabilization solution contains 1000 ppm commercial phosphino polycarboxylic acid inhibitor and 3000 ppm KCl in deionized water, adjusted to pH >8 with 10N NaOH.

The diluted test solutions were measured for barium using inductively coupled plasma. The concentration of barium in the undiluted test solutions was calculated from the measured values of barium. The percent barium sulfate inhibition was obtained from the following formula:

$$\text{Percent BaSO}_4 \text{ Inhibtion} = \frac{100 \times (\text{Ba Inhibitor} - \text{Ba No Inhibitor})}{\text{Ba Barium} - \text{Ba No Inhibitor}}$$

where:

Ba Inhibitor=concentration of barium in inhibitor test solution

Ba No Inhibitor=concentration of barium in no inhibitor test solution

Ba Barium=concentration of barium in barium test solution

EXAMPLE 3D

Test Method for Dynamic Capillary Tube Plugging/Scale Inhibition

The tube plugging evaluation was carried out using a PMAC Pressure Measurement and Control Unit (with adaptor kit for use with barium scale salts), manufactured by S.B. Systems of Aberdeen, Scotland, UK. The apparatus measures the change in pressure across a coil using a ceramic pressure sensor inside the apparatus. The resultant signal is amplified for conversion to a display curve on an external recorder. Experimental conditions include the following:

1. Stainless steel capillary: 500 mm length, 1.6 mm ID, 3.2 mm OD
2. Total flowrate: 1000 ml/h (linear speed: 0.138 meters/second)
3. 50/50 sea water/formation water
4. pH:4.0
5. Temperature: 90° C.
6. Pressure:1 bar

TABLE 13

| Composition of Barium- and Sulfate-Containing Solutions | | | |
| --- | --- | --- | --- |
| Barium-Containing Solution | | Sulfate-Containing Solution | |
| Component | grams/liter | Component | grams/liter |
| NaCl | 40.64 | NaCl | 24.52 |
| KCl | 0.469 | KCl | 0.757 |
| CaCl$_2$.2H$_2$O | 1.849 | CaCl$_2$.2H$_2$O | 1.534 |
| MgCl$_2$.6H$_2$O | 1.104 | MgCl$_2$.6H$_2$O | 11.12 |
| BaCl$_2$.2H$_2$O | 0.356 | Na$_2$SO$_4$ | 4.094 |
| SrCl$_2$.6H$_2$O | 0.548 | NaHCO$_3$ | 0.201 |
| CH$_3$COOHNa.3H$_2$O | 1.060 | Deionized water | balance |
| NaHCO$_3$ | 0.705 | | |
| Deionized water | balance | | |

Table 9 gives the compositions of formation water ("PMAC") and sea water (SSW-4) that are duplicated by the barium- and sulfate-containing solutions listed above.

All salts except the NaHCO$_3$ were added to the two solutions listed above and the flasks were filled almost to the mark with deionized water. The solutions were then sparged with CO$_2$ for 30 minutes, after which the NaHCO$_3$ was added to each solution and the flasks filled to the mark with deionized water. Each solution was then filtered through a 0.45 micron filter and adjusted to pH 4.0 with dilute HCl.

The concentration of polymer in the inhibitor solution was expressed as grams of polymer in the free acid (H) form. Compositions of inhibitor solutions were as follows:

| Inhibitor Solution | |
| --- | --- |
| Component | Concentration |
| Scale inhibitor to be tested | 1 g/liter |
| Sulfate-containing solution | Balance |

The inhibitor solution was adjusted to a pH of 4.0 with dilute HCl or dilute NaOH.

Following standard P●MAC procedures, the barium- and sulfate-containing solutions were fed continuously at a 50/50 ratio, and the inhibitor was fed at a rate to maintain a dosage of 8 ppm. The experiment was continued until plugging occurred.

EXAMPLE 4

Test Method for Static Adsorption Properties

Test conditions involved adding 10 grams of crushed rock (Tarbet formation sandstone) to a 50 milliliter (ml) plastic bottle, followed by the addition of 20 ml of the test solution (containing the scale inhibitor) and shaking the bottle to homogenize the contents. The test bottles were placed in an oven at 95° C. for 24 hours, afterwhich the contents of the bottles were filtered through a 0.22 micron pore size filter at the test temperature (95° C.). The crushed rock was prepared as follows: Tarbet formation core material (sandstone), originating from the Brent sequence of the North Sea, was solvent cleaned in toluene and then with a methanol/chloroform mixture (48 hours each). The cleaned sandstone was then dried and crushed to particles of less than 600 microns, with care taken not to crush individual grains.

We claim:

1. A method for inhibiting metal sulfate salt scale formation including barium sulfate in an aqueous fluid being present in or produced from an underground petroleum-bearing formation, comprising contacting the aqueous fluid with an effective amount of a water-soluble polymer comprising monomer units of:

(a) from 5 to 35 percent by weight of unsaturated sulfonic acid monomer selected from one or more of 2-acrylamido-2-methyl-1-propanesulfonic acid, 2-methacrylamido-2-methyl-1-propanesulfonic acid, 3-methacrylamido-2-hydroxy-1-propanesulfonic acid, allylsulfonic acid, allyloxybenzenesulfonic acid, 2-hydroxy-3-(2-propenyloxy)propanesulfonic acid, 2-methyl-2-propene-1-sulfonic acid, styrene sulfonic acid, vinyl sulfonic acid, 3-sulfopropyl acrylate, 3-sulfopropyl methacrylate and water-soluble salts thereof;

(b) from 5 to 70 percent by weight of unsaturated monocarboxylic acid monomer selected from one or more of acrylic acid, methacrylic acid, crotonic acid, vinylacetic acid and water-soluble salts thereof;

(c) from 10 to 70 percent by weight of unsaturated dicarboxylic acid monomer selected from one or more of maleic acid, maleic anhydride, fumaric acid, itaconic acid, citraconic acid, mesaconic acid, cyclohexenedicarboxylic acid, cis-1,2,3,6-tetrahydrophthalic anhydride, 3,6-epoxy-1,2,3,6-tetrahydrophthalic anhydride and water-soluble salts thereof; and (d) from 0 to 20 percent by weight of unsaturated non-ionizable monomer;

wherein the polymer has a weight average molecular weight of 1,000 to 20,000; wherein the aqueous fluid comprises inorganic ions selected from one or more of calcium, barium, strontium and sulfate ions; and wherein the aqueous fluid has a pH of 7.0 or less.

2. The method of claim 1 wherein the water-soluble polymer comprises monomer units of 10 to 20 percent by weight of the unsaturated sulfonic acid monomer and from 80 to 90 percent by weight of the unsaturated monocarboxylic acid and dicarboxylic acid monomers.

3. The method of claim 1 wherein the aqueous fluid has a pH of about 5.5 or less.

4. The method of claim 1 wherein the barium, calcium, strontium and sulfate ions are present in amounts from 100 to 2000 parts per million, 300 to 35000 parts per million, 100 to 1000 parts per million, and 500 to 5000 parts per million, respectively, wherein the amounts are parts per million by weight of the aqueous fluid.

5. The method of claim 1 wherein the barium, calcium, strontium and sulfate ions are present in amounts from 300 to 1500 parts per million, 1000 to 3000 parts per million, 200 to 500 parts per million, and 1000 to 3000 parts per million, respectively, wherein the amounts are parts per million by weight of the aqueous fluid.

6. The method of claim 1 wherein the water-soluble polymer comprises 10 to 15 percent by weight of 2-acrylamido-2-methyl-1-propanesulfonic acid monomer units or salts thereof, 15 to 65 percent by weight of acrylic acid monomer units or salts thereof and 25 to 70 percent by weight of maleic acid or maleic anhydride monomer units or salts thereof.

7. The method of claim 1 wherein the water-soluble polymer comprises 0 to 10 percent by weight of unsaturated non-ionizable monomer units selected from one or more of tert-butylacrylamide, acrylamide, vinyl acetate, vinyl alcohol, styrene, ethyl acrylate, butyl acrylate, butyl methacrylate, hydroxyethyl methacrylate and hydroxypropyl acrylate.

8. The method of claim 1 further comprising injecting an aqueous solution of the water-soluble polymer into the underground petroleum-bearing formations via a well bore in fluid communication with the underground petroleum-bearing formations, the water-soluble polymer being adsorbed within a matrix of the underground petroleum-bearing formations and then desorbed from the matrix into the aqueous fluid.

9. The method of claim 8 wherein the amount of water-soluble polymer is from 0.5 to 20% by weight of the aqueous solution.

10. The method of claim 8 wherein the amount of water-soluble polymer is from 2 to 10% by weight of the aqueous solution.

11. The method of claim 8 further comprising injecting additional aqueous solution of the water-soluble polymer into the underground petroleum-bearing formations at time intervals selected to provide amounts of the water-soluble polymer effective to maintain scale inhibition.

* * * * *